United States Patent
Willard

(10) Patent No.: US 6,622,305 B1
(45) Date of Patent: Sep. 16, 2003

(54) SYSTEM AND METHOD FOR DISPLAYING NEAR VIDEO ON DEMAND

(75) Inventor: Pierre Willard, Palo Alto, CA (US)

(73) Assignee: OpenTV, Inc., San Francisco, CA (US)

(*) Notice: Subject to any disclaimer, the term of this patent is extended or adjusted under 35 U.S.C. 154(b) by 0 days.

(21) Appl. No.: 09/512,959

(22) Filed: Feb. 25, 2000

(51) Int. Cl.$^7$ .......................... H04N 7/173; H04N 5/91
(52) U.S. Cl. .......................................... 725/101; 386/83
(58) Field of Search .................................. 725/101, 122; 348/6, 7, 10; 455/6, 6.2; 386/52, 55, 83

(56) References Cited

U.S. PATENT DOCUMENTS

| | | | | |
|---|---|---|---|---|
| 5,357,276 A | * | 10/1994 | Banker et al. | 725/102 |
| 5,594,491 A | * | 1/1997 | Hodge | 725/103 |
| 5,721,823 A | * | 2/1998 | Chen | 709/203 |
| 5,831,662 A | * | 11/1998 | Payton | 725/122 |
| 5,884,141 A | * | 3/1999 | Inoue | 725/101 |
| 6,327,418 B1 | * | 12/2001 | Barton | 386/46 |

* cited by examiner

Primary Examiner—Andrew Faile
Assistant Examiner—Hunter Lonsberry
(74) Attorney, Agent, or Firm—Meyertons, Hood, Kivlin, Kowert & Goetzel, PC; Rory D. Rankin

(57) ABSTRACT

A method for display of near video on demand programs broadcast over a network system to a receiver operable to record at least one channel. The program includes a plurality of segments broadcast over two or more channels during a plurality of time intervals. The method includes displaying a first segment of the program as it is broadcast at a first time interval and recording a second segment of the program at the first time interval if the second segment is not scheduled for broadcast at a second time interval. The second segment is displayed if broadcast at the second time interval or the recorded second segment is played at the second time interval if not broadcast. The steps of recording and displaying are repeated for remaining segments of the program until the last segment of the program is displayed. A method for scheduling broadcast of near video on demand programs and a system for displaying near video on demand programs are also disclosed.

16 Claims, 4 Drawing Sheets

SYSTEM AND METHOD FOR DISPLAYING NEAR VIDEO ON DEMAND

BACKGROUND OF THE INVENTION

The present invention relates generally to video programs on demand, and more particularly, a system and method for displaying near video on demand programs.

Video on demand services provide viewers with video programming such as select movies or television programs whenever the viewer desires to view the program. A new video sequence is broadcast immediately over the network upon viewer request. Video on demand services are often provided in hotels or other locations having internal wide band networks. Video on demand is typically not provided by broadcast networks since a video on demand system requires an extremely large sized data transmission system and broadcast networks have access only to a limited bandwidth. However, with limited bandwidth availability networks may broadcast video programs starting at various times, such as every half hour or hour. This is referred to as near video on demand (NVOD). An NVOD system transmits program data to a plurality of channels at predetermined time intervals. In NVOD programming, the network broadcasts duplicate versions of a program with the starting time of each version offset by a predetermined increment (i.e., time-shifted).

In order for a network to provide NVOD programs at regular intervals, the network must broadcast the programs on a number of different channels. For example, if a ninety minute program is broadcast for viewing every thirty minutes, the network must broadcast the program on three channels Ch1, Ch2, Ch3 time shifted as shown in Table I.

TABLE I

| Channel | Time | | | |
| --- | --- | --- | --- | --- |
|  | t0 | t1 | t2 | t3 |
| Ch1 | S1 | S2 | S3 | S1 |
| Ch2 | S2 | S3 | S1 | S2 |
| Ch3 | S3 | S1 | S2 | S3 |

The program is broken up into three thirty minute segments S1, S2, and S3. The first segment S1 includes the first thirty minutes of the program, the second segment S2 includes the second thirty minutes of the program, and the third segment S3 includes the last thirty minutes of the program. Thus, at time t0, a viewer may select channel 1 (Ch1) and view the entire program starting from the beginning of the program. At time t1, a viewer wishing to view the program from the beginning selects channel 3 (Ch3). Similarly, a viewer may select channel 2 (Ch2) at time t2 to view the entire program from the beginning.

As can be observed from the foregoing, as the length of a program increases or the interval between presentations is reduced, the number of channels increases, resulting in an increase in bandwidth and cost for providing NVOD on broadcast networks.

There is, therefore, a need for a more efficient system and method for displaying NVOD programs on broadcast networks.

SUMMARY OF THE INVENTION

A system and method for displaying near video on demand programs are disclosed. A method of the present invention is for displaying near video on demand programs broadcast over a network system to a receiver operable to record at least one channel while playing another channel or a prerecorded program. The program is broken into a plurality of segments which are broadcast over two or more channels during a plurality of time intervals. The method generally includes displaying a first segment of the program as it is broadcast at a first time interval and recording a second segment of the program at the first time interval if the second segment is not scheduled for broadcast at a second time interval. The method further includes recording a third segment of the program at one of the first and second time intervals if the third segment is not scheduled for broadcast at a third time interval. The steps of recording and displaying are repeated for remaining segments of the program until the last segment of the program is displayed.

In another aspect of the invention, a method for scheduling broadcast of a near video on demand program generally comprises selecting a channel for broadcast of a first program segment for each of the plurality of time intervals and scheduling the remaining program segments for either broadcast or recording from one of the channels during one or more of the time intervals so that a program can be viewed in a continuous sequence from the first segment to a last segment of the program.

A system of the present invention is for displaying near video on demand programs generally comprises a receiver operable to receive the programs, a recording device operable to record a segment broadcast on one of the channels, and a playback device operable to play the recorded segment. The system further includes a processor operable to direct the recording device to record one of the segments during one of the time intervals and switch between the channels and the playback device to display the segments so that the program can be viewed in a continuous sequence from a first segment to a last segment of the program.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
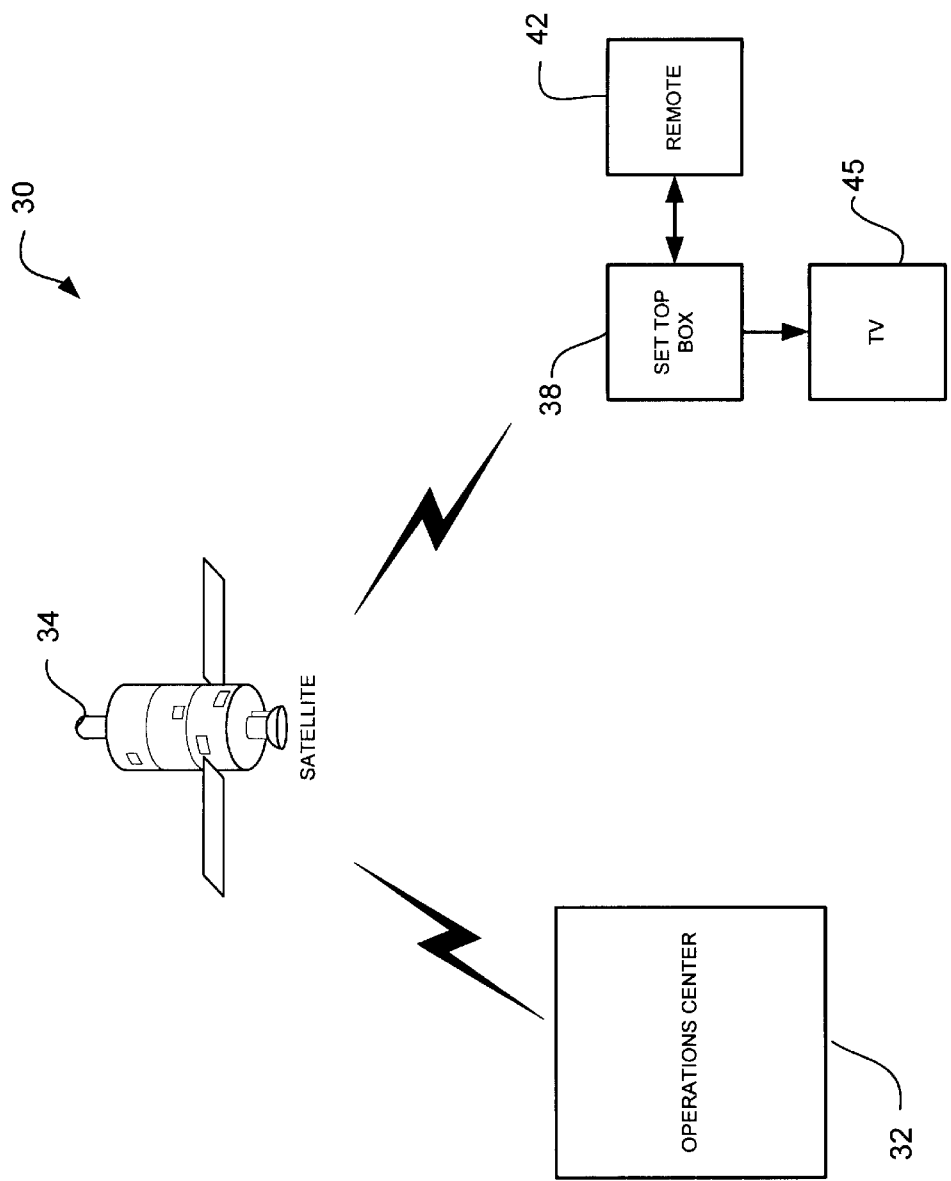
FIG. 1 is a schematic of an exemplary system for delivery and display of near video on demand programs.

Referring now to the drawings, and first to FIG. 1, a system 30 used to broadcast and receive near video on demand (NVOD) programs is shown. As described below, the NVOD programs are broadcast on multiplexed channels according to a predetermined periodicity. In one embodiment, the system 30 includes an operations center 32 where control information is assembled in the form of digital data, a digital compression system where the digital data is compressed, combined, multiplexed, encoded, and mapped into digital signals for satellite 34 transmission to a plurality of in home set top boxes 38, or other suitable receivers, operable to decompress the digital data and display programs to a viewer. The decompressed video signals may be converted into analog signals such as NTSC (National Television Standards Committee) format signals for television 45 display. The signal is typically compressed prior to transmission and may be transmitted through broadcast channels such as cable television lines (not shown) or direct satellite transmission systems (as shown in FIG. 1). Telephone lines, cellular networks, and fiber optics may also be used in place of the cable or satellite system. Control signals sent to the set top box 38 are also decompressed and either executed immediately or placed in local storage such as RAM. The set top box 38 may be used to overlay or combine different signals to form the desired display on the viewer's television 45.

It is to be understood that the system 30 described above and shown herein is only one example of a system used to convey signals to the television 45. The broadcast network system may be different than described herein without departing from the scope of the invention.

Figure 2:
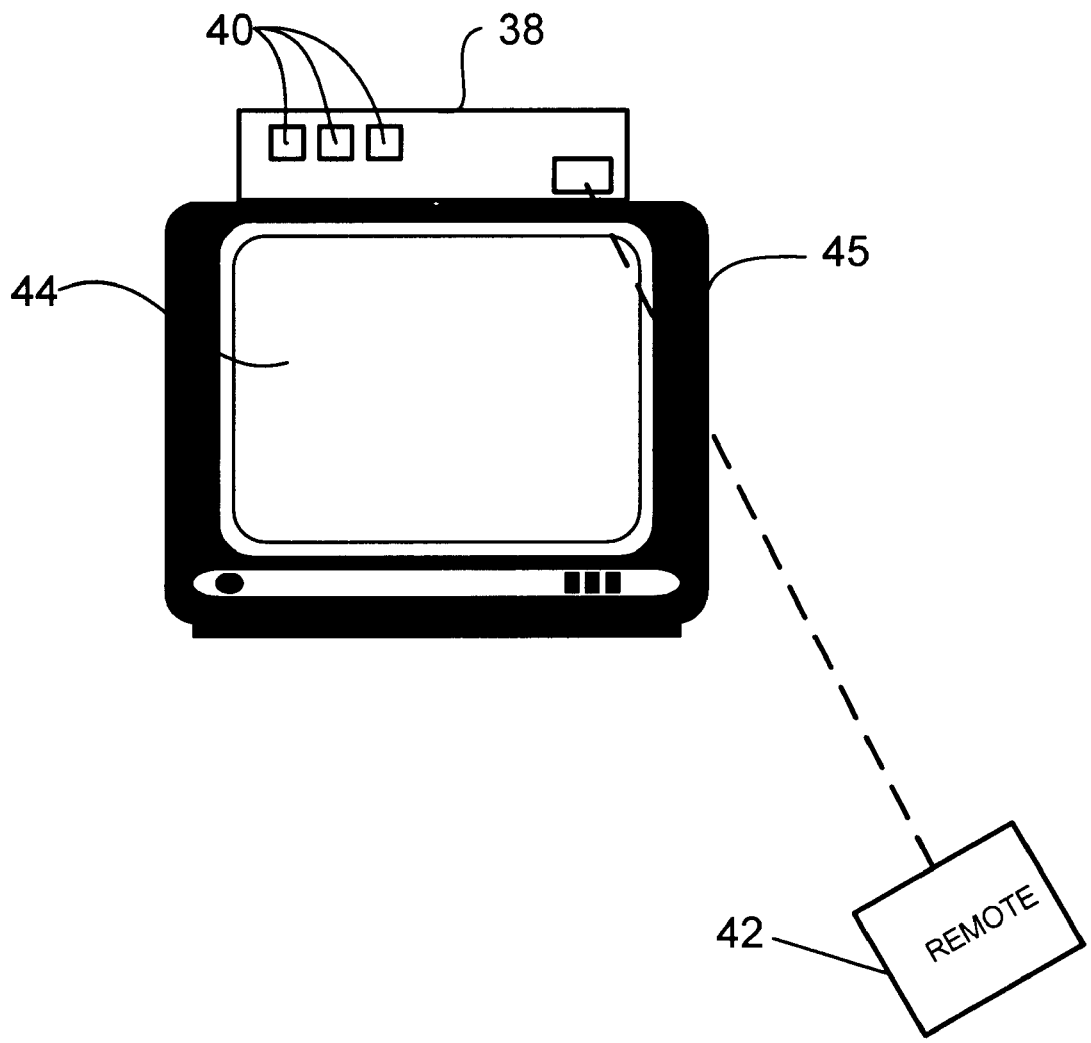
FIG. 2 is a schematic of a set top box connected to a television and configured for receiving input from a head-end system.

The video signals and program control signals received by the set top box 38 correspond to television programs and menu selections that the viewer may access through a viewer interface (FIG. 2). The viewer may control the set top box 38 through an infrared remote control unit or a control panel on the set top box, for example. The viewer interface may be buttons 40 located on the set top box 38 or a portable remote control 42 which operates the set top box or interfaces with control objects displayed on television screen 44.

The set top box 38 is preferably a digital set top box for use with wireless cable and a satellite receiver or satellite integrated decoder receiver that is capable of decoding MPEG video, audio, and data, for example. The set top box 38 may also be configured for receiving only analog signals or both analog and digital signals. The set top box 38 may be configured, for example, to receive the following input: analog video channels; digital video channels which support broadband communications using Quadrature Amplitude Modulation (QAM); and control channels for two-way signaling and messaging. The digital QAM channels carry compressed and encoded multiprogram MPEG (Motion Picture Experts Group) transport streams. A transport system extracts the desired program from the transport stream and separates the audio, video, and data components, which are routed to an audio decoder, video decoder, and RAM, respectively. The broadband analog signal (e.g., 680, 750, 860 MHz) received by the set top box 38 carries multiple channels and is conveyed to a tuner which selects one frequency band out of the available spectrum.

Figure 3:
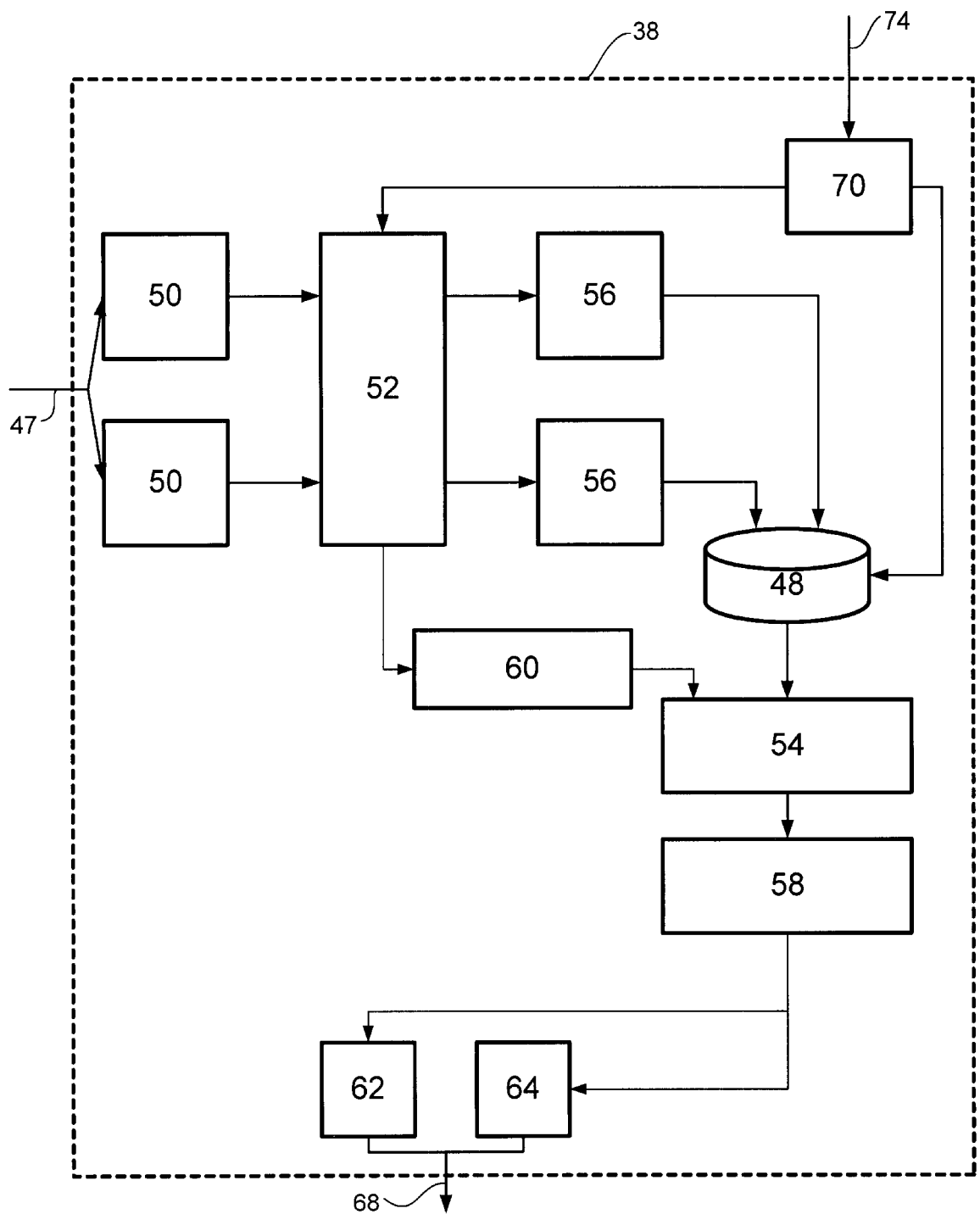
FIG. 3 is a block diagram of the set top box of FIG. 2.

The set top box 38 includes a hard disk 48 for recording and storing received signals (FIG. 3). The set top box 38 is operable to record at least one channel while the viewer is viewing another channel or a program previously recorded on the disk 48. The signals 47 received by a tuner/demodulator 50 within the set top box 38 are sent to a switch matrix 52 which sends the signals either directly to a demultiplexer 60 and then to a selecting circuit 54 through a full transport stream, or via demultiplexers 56 to the hard disk 48 for storage. The selecting circuit 54 is connected to a descrambler 58 which provides signals to a video decoder 62 and audio decoder 64 which deliver audio and video output 68 to the television.

The set top box 38 further includes a processor 70 which receives data 74 containing information on the broadcast sequence (i.e., time) and location (i.e., channel) of each segment of a program. The processor 70 utilizes this program data to select a channel to record a segment for later viewing, and switch between a channel displaying a broadcast segment and a previously recorded segment or a different channel displaying the next segment, to present a continuous program (i.e., from start to end) to the viewer. The processor 70 interfaces with the hard drive 48, selecting circuits 54, and switch matrix 52 to initiate recording of a segment, playing of a previously recorded segment, or directly displaying a live broadcast segment. Thus, once a viewer selects a channel displaying a first segment of a program, the processor will record another segment, change between channels, or play a previously recorded segment, as required to display the entire program, without any input from the viewer.

As described above, with conventional NVOD systems the number of channels required is equal to the number of segments within each program. For example, if a network broadcasts a ninety minute program at thirty minute intervals, the program will include three segments. The number of required channels can be determined as follows:

Number of channels=number of segments=length of program/interval.

The method described below reduces the number of channels required to provide NVOD by recording a segment broadcast on a channel different than the channel playing for later viewing. For example, with conventional NVOD systems described above, three channels are required to broadcast a ninety minute program at thirty minute intervals (See Table I above). The present method requires only two channels to broadcast the same ninety minute program at thirty minute intervals by scheduling the segments as shown in Table 1.

TABLE 1

| Channel | Time | | | | | |
|---------|------|------|------|------|------|------|
|         | t0   | t1   | t2   | t3   | t4   | t5   |
| Ch1     | S1   | S2   | S3   | S1   | S2   | S3   |
| Ch2     | S2   | S1   | S1   | S2   | S1   | S1   |

The viewer may be presented with a menu with a list of virtual channels (e.g., N channels for N segments). When the viewer selects one of the virtual channels, the set top box 38 automatically tunes to the appropriate 'real' channel. If a viewer wants to watch a program starting at time t0, the viewer will select the appropriate menu option and the set top box 38 will tune into channel 1. The viewer will then watch the program all the way through as each segment S1, S2, and S3 is broadcast and displayed on the television. If a viewer wants to watch the program starting at time t1, the set top box selects channel 2 and the viewer watches segment S1 while it is being broadcast. At the same time t1, the set top box 38 records segment S2. At time t2 the set top box 38 plays back segment S2 to the viewer from the hard disk 48, while recording segment S3 broadcast on channel 1. At time t3, the set top box 30 stops recording and plays previously recorded segment S3.

If a viewer wants to watch the program starting at time t2, the viewer will watch segment S1 as it is broadcast on channel 2. The set top box 38 will also record segment S3 at time t2. At time t3 the set top box 38 will continue to directly display the broadcast on channel 2 (segment 2). At time t4 the set top box 38 will switch from the live broadcast on channel 2 to the prerecorded segment S3.

The program schedule shown in Table 1 reduces the number of segments required for broadcasting from nine for a conventional NVOD system to six segments (i.e., ratio of 0.67) over a time period from t0 to t2.

It will be noted that if a set top box does not have recording capability, a viewer can still watch the program from beginning to end, however, the viewer can only start the program every ninety minutes, rather than every thirty minutes. Thus, the broadcast schedule described herein is compatible with set top boxes which do not have recording capability Another possible broadcast arrangement for a ninety minute program with thirty minute intervals (or any other three segment program) is shown in Table 2:

TABLE 2

| Time | \multicolumn{7}{c}{Channel} | | | | | | |
|------|----|----|----|----|----|----|----|
|      | t0 | t1 | t2 | t3 | t4 | t5 | t6 |
| Ch1  | S1 | S1 | S1 | S1 | S1 | S1 | S1 |
| Ch2  | —  | S2 | —  | S2 | —  | S2 | —  |
| Ch3  | —  | —  | S3 | —  | —  | S3 | —  |

At time t0 a viewer starts to watch the program on channel 1 and views segment S1 directly as it is broadcast from the network. The set top box 38 receives a description of the sequence of the program from the network and switches the displayed program to channel 2 at time t1 to present a continuous display of the program. At time t2 the set top box 38 switches the channel from channel 2 to channel 3. The switching of the channels is performed automatically by the set top box 38 in a manner that is not readily apparent to the viewer. If a viewer wants to watch the program starting at time t1, he will watch segment S1 broadcast on channel 1. At the same time segment S2 will be recorded by the set top box 38. At time t2, the viewer will watch the earlier recorded segment S2 while segment S3 is being recorded. At time t3 the viewer will watch prerecorded segment S3. If a viewer starts a program at time t2 he will watch the first segment S1 while segment is S3 is recorded. The viewer will then watch the live broadcast of segment S2 at time t3 and the prerecorded segment S3 at time t4. If a viewer wishes to start the program at time t3, he will first watch segment 1 broadcast on channel 1. At the same time t3 segment S2 will be recorded by the set top box 38. At time t4 the set top box 38 will play the previously recorded segment S2 and at time t5 the set top box will switch to channel 3 and display segment S3 directly as it is broadcast by the network. Similarly, if a viewer begins to watch the program at time t4, the viewer will watch segment S1 as it is broadcast on channel 1. At time t5 the set top box 38 will switch to channel 2 and display segment S2 as it is broadcast while recording segment S3 on channel 3. At time t6, the set top box 38 will play back previously recorded segment S3 to the viewer.

The arrangement shown in Table 2 requires a set top box operable to record two segments in parallel. For example, at time t5 a viewer will watch segment S1 as it is broadcast on channel 1. The set top box 38 must record both channels 2 and 3 at time t5 to record segments S2 and S3. This arrangement, however, provides additional bandwidth for displaying other programs. The time slots indicated in Table 2 with "- -" instead of a segment indicate that the channel does not need to broadcast one of the segments and may be used to broadcast another program. The broadcast arrangement shown in Table 2 reduces the total number of segments from 18 for conventional NVOD systems to 11 for a time period from t0 to t5.

The scheduling of the program segments may be arranged to optimize bandwidth (minimize number of segments broadcasted); reduce the number of channels required (reduce head-end cost); reduce the number of times the set top box 38 has to switch between channels or between the displaying of a direct broadcast and a recording; or reduce the latency between the start of programs for set top boxes without recording capability.

The number N of broadcast channels required to provide NVOD viewing for a program can be calculated as follows:

$$N = \text{INTEGER}((D+L-1)/L)$$

where:

N=number of channels;

D=duration of program;

L=interval between start of programs; and

INTEGER (X) replaces X with an integer by rounding the value X down to the next whole number.

For example, if a program has a duration D of ninety minutes and is to be broadcast every thirty minutes, the number of channels required is:

$$N = \text{INT}((90+30-1)/30) = 3 \text{ channels.}$$

If the set top box is configured to record N−1 channels at one time, then each segment S(x) (where x=1 to N) would need to be broadcast only every L*x segment (see Table 2). S(x) would therefore be broadcast N/x times during one continuous broadcast of the program. The total number of segments may therefore, be calculated as:

$$\text{Number of segments} = \text{INTEGER}[N(1+\tfrac{1}{2}+\tfrac{1}{3}+\ldots 1/N)].$$

For a program with three segments broadcast on three channels, as shown in Table 2, the number of segments that must be broadcast during one continuous broadcast (i.e., t0–t2) is calculated as:

$$\text{Number of segments} = 3(1+\tfrac{1}{2}+\tfrac{1}{3}) = 5.$$

This is a mean value. For example, in Table 2 there are five segments for t0 to t2 and six segments for t3 to t5. In comparison, conventional NVOD systems require 9 segments (i.e., N*N segments).

The following tables (Tables 3–8) show possible solutions for scheduling a program having from three to seven segments with a set top box configured to record one channel at a time. Two solutions for five segments are shown. One is optimized for bandwidth and the other allows for two views without any recording. Below each table is shown the recording sequences required starting at each time interval. Seq(i) is the recording sequence for start time t(i−1). A "- -" means no recording is taking place. It can be observed from the table from which channel each segment is recorded.

TABLE 3

| Channel | Time | | |
|---|---|---|---|
| | t0 | t1 | t2 |
| Ch1 | S1 | S2 | S3 |
| Ch2 | S2 | S1 | S1 |

Seq1 Recording: — — —
Seq2 Recording: S2 S3 —
Seq3 Recording: S3 — —

TABLE 4

| Channel | Time | | | |
|---|---|---|---|---|
| | t0 | t1 | t2 | t3 |
| Ch1 | S1 | S2 | S3 | S4 |
| Ch2 | S3 | S4 | S1 | S2 |
| Ch3 | — | S1 | — | S1 |

Seq1 Recording: — — — —
Seq2 Recording: S2 S3 S4 —
Seq3 Recording: — — — —
Seq4 Recording: S2 S3 S4 —

TABLE 5

| Channel | Time | | | | |
|---|---|---|---|---|---|
| | t0 | t1 | t2 | t3 | t4 |
| Ch1 | S1 | S2 | S3 | S4 | S5 |
| Ch2 | S3 | S1 | S1 | S2 | S1 |
| Ch3 | S2 | S4 | — | S1 | — |

Seq1 Recording: — — — — —
Seq2 Recording: S2 S3 S4 S5 —
Seq3 Recording: S3 S4 S5 — —
Seq4 Recording: S2 S5 — — —
Seq5 Recording: S5 S3 S4 — —

TABLE 6

| Channel | Time | | | | |
|---|---|---|---|---|---|
| | t0 | t1 | t2 | t3 | t4 |
| Ch1 | S1 | S2 | S3 | S4 | S5 |
| Ch2 | S4 | S5 | S1 | S2 | S3 |
| Ch3 | S2 | S1 | — | S1 | S1 |

Seq1 Recording: — — — — —
Seq2 Recording: S2 S3 S4 S5 —
Seq3 Recording: — — — — —
Seq4 Recording: S2 S3 S4 S5 —
Seq5 Recording: S3 S4 S5 — —

TABLE 7

| Channel | Time | | | | | |
|---|---|---|---|---|---|---|
| | t0 | t1 | T2 | t3 | t4 | t5 |
| Ch1 | S1 | S2 | S3 | S4 | S5 | S6 |
| Ch2 | S2 | S1 | S1 | S2 | S1 | S1 |
| Ch3 | S4 | S5 | S6 | S1 | S2 | S3 |

Seq1 Recording: — — — — — —
Seq2 Recording: S2 S3 S4 S5 S6 —
Seq3 Recording: S3 S4 S5 S6 — —
Seq4 Recording: — — — — — —
Seq5 Recording: S2 S3 S4 S5 S6 —
Seq6 Recording: S3 S4 S5 S6 — —

TABLE 8

| Time | Channel | | | | | | |
|---|---|---|---|---|---|---|---|
| | t0 | t1 | t2 | t3 | t4 | t5 | t6 |
| Ch1 | S1 | S2 | S3 | S4 | S5 | S6 | S7 |
| Ch2 | S2 | S1 | — | S1 | — | S1 | S1 |
| Ch3 | S6 | S7 | S1 | S2 | S3 | S4 | S5 |
| Ch4 | S4 | S5 | S6 | S7 | S1 | S2 | S3 |

Seq1 Recording: — — — — — — —
Seq2 Recording: S2 S3 S4 S5 S6 S7 —
Seq3 Recording: — — — — — — —
Seq4 Recording: S2 S3 S4 S5 S6 S7 —
Seq5 Recording: — — — — — — —
Seq6 Recording: S2 S3 S4 S5 S6 S7 —
Seq7 Recording: S3 S4 S5 S6 S7 — —

The above solutions optimize bandwidth by minimizing the number of segments broadcast. As described above, the segments may also be arranged to optimize the number of channels, switching of channels or compatibility with non-recording set top boxes.

Figure 4:
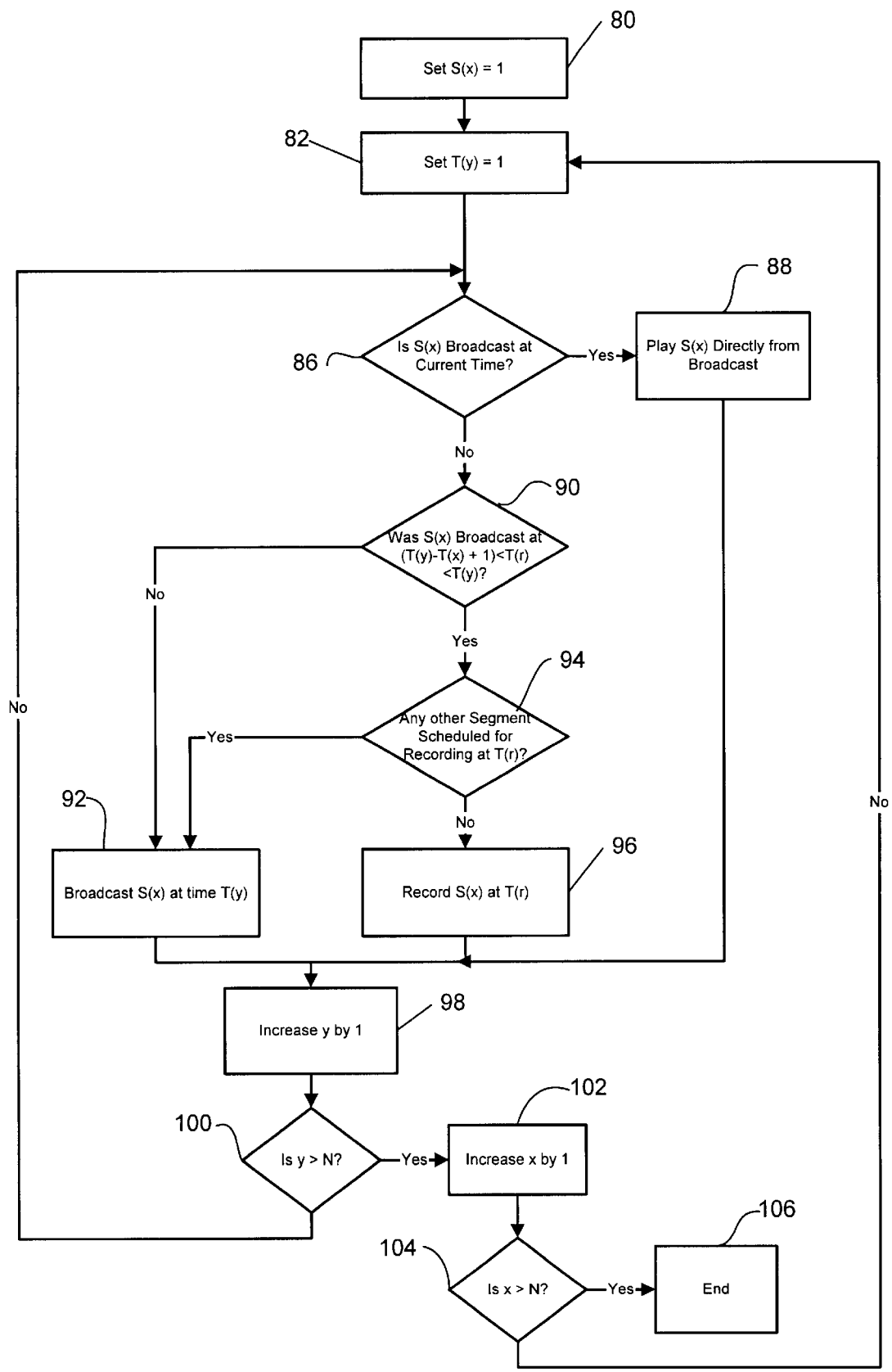
FIG. 4 is a flowchart illustrating a process for scheduling NVOD programs.

FIG. 4 is a flowchart illustrating a process for scheduling segment broadcasts and recording of segments. At step 80, S(x) is set equal to 1 to begin a loop to schedule all segments S(x), where x=1 to N (N=number of segments within a program). At step 82, T(y) is set equal to 1 to begin a second loop which runs through each time interval from y=1 to N for each segment S(x). All segments S1 are first scheduled for all start times. Then all segments S2 through the last segment are scheduled. It is first determined if S(x) is already being broadcast at the current time T(y) (step 86). If S(x) is already being broadcast at T(y), it will be played directly from the broadcast channel (step 88). If S(x) is not being broadcast at time T(y), the schedule will be reviewed to see if S(x) was broadcast at time T(r) located between the start of the current program sequence and the current time (i.e., (T(y)−T(x)+1)<T(r)<Ty) (step 90). If it was broadcast at T(r) it will be recorded at that time if there is no other segment already being recorded (steps 94 and 96). If it was not already broadcast or another segment was already scheduled for recording, the segment will need to be broadcast at time T(y) (step 92). The time interval loop will be repeated until y=N (steps 98 and 100). The process will then be repeated for each segment S(x) until x=N (steps 102, 104, and 106).

The schedule may then be arranged to optimize bandwidth or one of the other variables described above. After a schedule has been determined, a data file indicating which channels to display or record at specified time intervals will be sent to the set top box 38 along with the NVOD programs. The processor 70 will use this information to record a segment, switch between channels for display of a broadcast segment, or playback a previously recorded segment.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for displaying near video on demand programs broadcast over a network system, the program comprising a plurality of segments broadcast over two or more channels during a plurality of time intervals, at least one of said channels broadcasting the plurality of segments in sequence, the method comprising:

displaying the plurality of segments in sequence when the program is received at a non-recording receiver; and displaying the program on a recording receiver, by performing the steps of:

displaying a first segment of the program as it is broadcast at a first time interval;

recording a second segment of the program at said first time interval if the second segment is not scheduled for broadcast at a second time interval:

displaying the second segment if broadcast at said second time interval or playing the recorded second segment at said second time interval if not broadcast:

recording a third segment of the program at one of the first and second time intervals if the third segment is not scheduled for broadcast at a third time interval; and repeating the steps of recording and displaying for remaining segments of the program until the last segment of the program is displayed.

2. The method of claim 1 wherein displaying the second segment on the recording receiver comprises switching between broadcast channels.

3. The method of claim 1 wherein the programs are television broadcast programs.

4. The method of claim 1 wherein the recording receiver is a set top box.

5. The method of claim 4 wherein the set top box is a digital set top box.

6. The method of claim 1 wherein the non-recording receiver is a set top box.

7. The method of claim 6 wherein the set top box is a digital set top box.

8. The method of claim 1 further comprising developing a broadcast schedule for said segments to minimize total number of segments broadcast.

9. The method of claim 1 further comprising developing a broadcast schedule for said segments to minimize switching between channels for adjacent time intervals.

10. The method of claim 1 further comprising developing a broadcast schedule for said segments to minimize the number of channels required.

11. A method for displaying a near video on demand program comprising a plurality of segments broadcast over a plurality of channels in a network system, the plurality of segments being broadcast in sequence over at least one of said channels, the method displaying the program during a plurality of time intervals and comprising the steps of:

displaying the plurality of segments in sequence on the at least one of said channels when the program is received on a non-recording receiver; and when the program is received on a recording receiver, starting at a first time interval, performing the steps of:

selecting a channel that is broadcasting a first segment of the program;

displaying the first segment of the program as it is broadcast;

recording a next segment of the program if it is not scheduled for broadcasting in a next time interval; and at each subsequent time interval, performing the steps of:

selecting a first channel that is broadcasting the next segment and displaying the next segment as it is broadcast;

if no channel is broadcasting the next segment of the program, displaying a recorded next segment of the program;

selecting a second channel that is broadcasting a segment after the segment being displayed and recording the segment after the segment being displayed as it is broadcast.

12. The method of claim 11 wherein displaying the next segment on a recording receiver comprises switching between broadcast channels.

13. The method of claim 11 wherein the programs are television broadcast programs.

14. The method of claim 11 further comprising developing a broadcast schedule for said segments to minimize total number of segments broadcast.

15. The method of claim 11 further comprising developing a broadcast schedule for said segments to minimize switching between channels for adjacent time intervals.

16. The method of claim 11 further comprising developing a broadcast schedule for said segments to minimize the number of channels required.

* * * * *